(12) United States Patent
Inokuchi et al.

(10) Patent No.: US 8,106,547 B2
(45) Date of Patent: Jan. 31, 2012

(54) ROTARY ELECTRIC MACHINE FOR VEHICLES

(75) Inventors: Takatoshi Inokuchi, Kariya (JP); Atsushi Umeda, Okazaki (JP)

(73) Assignee: Denso Corporation, Kariya (JP)

( * ) Notice: Subject to any disclaimer, the term of this patent is extended or adjusted under 35 U.S.C. 154(b) by 176 days.

(21) Appl. No.: 12/458,020

(22) Filed: Jun. 29, 2009

(65) Prior Publication Data

US 2010/0001595 A1 Jan. 7, 2010

(30) Foreign Application Priority Data

Jul. 3, 2008 (JP) .................................. 2008-174051

(51) Int. Cl.
*H02K 11/00* (2006.01)
(52) U.S. Cl. ........................................ 310/68 D; 310/64
(58) Field of Classification Search ................ 310/68 D, 310/64, 67 R
See application file for complete search history.

(56) References Cited

U.S. PATENT DOCUMENTS

| | | | |
|---|---|---|---|
| 5,710,467 A * | 1/1998 | Irie et al. ........................... | 310/64 |
| 5,742,498 A | 4/1998 | Taniguchi et al. | |
| 5,780,996 A | 7/1998 | Kusase et al. | |
| 6,307,289 B1 | 10/2001 | Skala | |
| 6,426,575 B1 * | 7/2002 | Masegi et al. ............... | 310/68 D |
| 6,528,911 B1 | 3/2003 | De Petris | |
| 7,196,439 B2 | 3/2007 | Pierret et al. | |
| 2004/0041476 A1 | 3/2004 | Ihata et al. | |
| 2006/0181162 A1 | 8/2006 | Pierret et al. | |
| 2006/0192446 A1 | 8/2006 | Ihata et al. | |

FOREIGN PATENT DOCUMENTS

| | | |
|---|---|---|
| JP | U-64-16164 | 1/1989 |
| JP | A-03-74163 | 3/1991 |
| JP | A-06-078504 | 3/1994 |
| JP | A-06-318657 | 11/1994 |
| JP | A-08-331818 | 12/1996 |
| JP | A-09-9522 | 1/1997 |
| JP | A-09-157440 | 6/1997 |
| JP | A-10-331281 | 12/1998 |
| JP | A-2002-519987 | 7/2002 |
| JP | A-2004-147486 | 5/2004 |
| JP | A-2004-208467 | 7/2004 |
| JP | A-2006-504386 | 2/2006 |
| JP | A-2007-288848 | 11/2007 |
| JP | A-2008-108950 | 5/2008 |
| WO | WO 00/01055 | 1/2000 |
| WO | WO 2009/024709 A2 | 2/2009 |

OTHER PUBLICATIONS

Office Action issued in Japanese Patent Application No. 2008-174051, on Apr. 20, 2010 (with translation).
Nov. 18, 2009 Search Report issued in European Application No. 09008563.0.

* cited by examiner

*Primary Examiner* — Nguyen N Hanh
(74) *Attorney, Agent, or Firm* — Oliff & Berridge, PLC

(57) ABSTRACT

A rotary electric machine for vehicles is provided, which includes a rotor, a stator disposed opposed to the rotor, a frame made of aluminum and supporting the rotor and the stator, and a rectifier secured to an outer end face of the frame and having low-loss elements as rectifying elements. A heat insulator is disposed between the rectifier and the frame. With this configuration, deterioration can be prevented in the overall cooling properties, while at the same time the cooling properties of the rectifier can be enhanced.

19 Claims, 3 Drawing Sheets

VEHICLE ALTERNATOR

ROTARY ELECTRIC MACHINE FOR VEHICLES

CROSS-REFERENCE TO RELATED APPLICATION

This application is based on and claims the benefit of priority from earlier Japanese Patent Application No. 2008-174051 filed Jul. 3, 2008, the description of which is incorporated herein by reference.

BACKGROUND OF THE INVENTION

1. Field of the Invention

The present invention relates to a rotary electric machine which is loaded on vehicles, such as passenger cars and trucks.

2. Related Art

A type of rectifier that has been known is disclosed in Japanese Patent Application Laid-Open Publication No. 2002-519987, for example. This type of rectifier has a two-layer structure in which a positive fin (positive heat sink) and a negative fin (negative heat sink) are disposed along the direction of the rotary shaft. In this type of rectifier, the base portion of each of negative diodes is press-fitted to the negative fin so as to be projected out of the end face of the negative fin into the direction of the frame, for direct contact with the base of the frame. With this structure, the heat generated by the negative diodes can be transferred to the frame to enhance the cooling properties.

Also, a type of vehicle alternator that has been known is disclosed in Japanese Patent Application Laid-Open Publication No. 06-078504, for example. This type of vehicle alternator has a structure in which a heat-reflective member is disposed at an inner peripheral surface of the frame (rear bracket), which surface faces the stator coil, via a heat insulator. With this structure, heat can radiate effectively from the diodes of the rectifier to the frame (rear bracket).

The structure disclosed in Japanese Patent Application Laid-Open Publication No. 2002-519987 is based on the premise that the temperature of the rectifier is higher than that of the frame. Accordingly, if the temperature of the rectifier becomes lower than that of the frame due to reduction of electrical resistance of the rectifying elements, for example, heat will contrarily be transferred from the frame to the rectifier.

As a result, the temperature of the rectifier will be undesirably raised due to the heat transferred from the frame. A countermeasure that can be taken for reducing the temperature of the frame in this case may be to combine the structure disclose in Japanese Patent Application Laid-Open Publication No. 06-078504 with the structure disclosed in Japanese Patent Application Laid-Open Publication No. 2002-519987.

However, preventing the heat transfer from the stator coil to the frame may hinder cooling of the stator coil, because the cooling is actually produced by permitting the heat to escape from the stator coil to the frame. Thus, when the above structures are combined, concerns may arise that the cooling properties of the entire vehicle alternator may be deteriorated. Therefore, the countermeasure mentioned above may not be preferable.

SUMMARY OF THE INVENTION

The present invention has been made in light of the problem mentioned above, and has as its object to provide a rotary electric machine for vehicles which is able to prevent deterioration in overall cooling properties and to enhance the cooling properties of the rectifier.

In order to solve the problem explained above, the rotary electric machine for vehicles of the present invention comprises a rotor, a stator disposed opposed to the rotor, a frame made of aluminum and supporting the rotor and the stator, a rectifier secured to an outer end face of the frame and having low-loss elements used as rectifying elements, and a heat insulator disposed between the rectifier and the frame.

Use of the low-loss elements can reduce the amount of heat generated by the rectifier per se. Also, by arranging the heat insulator between the rectifier and the frame, the heat radiated from the frame can be shielded by the heat insulator, whereby the cooling properties of the rectifier can be enhanced. In addition, the heat generated in the stator of the rotary electric machine for vehicles can be transferred to the frame, whereby the overall cooling properties can be prevented from being deteriorated.

It is preferred that the low-loss elements mentioned above are low-loss diodes. Alternatively, it is preferred that the low-loss elements mentioned above are MOS transistors. Use of these elements can reduce losses during power on, compared with the generally used silicon diodes.

It is preferred that the heat insulator mentioned above is formed of a material having heat conductivity smaller than that of aluminum. Thus, compared with the case where a frame made of aluminum is directly secured to a rectifier, the cooling properties of the rectifier can be enhanced because the heat from the frame can be reduced.

It is preferred that the heat insulator mentioned above is formed of stainless steel, ceramic, a resin, or glass.

The heat insulator may be formed easily by using each of these materials. Further, concurrently with the heat insulation, use of stainless steel, for example, as an electrically conductive material for forming the heat insulator, may enable electrical connection between a negative-side radiator plate of the rectifier and the frame. In addition, concurrently with the heat insulation, use of a resin, for example, as an electrically insulating material for forming the heat insulator, may ensure electrical insulation between a positive-side radiator plate of the rectifier and the frame.

It is preferred that the heat insulator is provided as a gap which is formed by locating both the rectifier and the frame to be spatially apart from each other by a distance corresponding to the gap. This may contribute to reducing the number of parts to thereby reduce the cost. At the same time, by utilizing the heat insulator (the gap) as a passage for cooling air, the amount of cooling air can be increased.

It is preferred that the rectifier is secured to the frame by means of a screw which is formed of a material having heat conductivity smaller than that of aluminum. The material may be stainless steel. This may reduce the heat that will be transferred to the rectifier from the frame via the screw used for securing the rectifier to the frame.

It is desirable that the rectifier comprises a positive-side radiator plate joined with positive-side rectifying elements and a negative-side radiator plate joined with negative-side rectifying elements; the negative-side radiator plate is disposed opposed to the frame with an interposition of the heat insulator; and the heat insulator is formed of an electrically conductive material to establish electrical connection between the negative-side radiator plate and frame via the heat insulator. In particular, it is preferred that the heat insulator is an electrically conductive body having a hollow structure. Use of such a heat insulator may enable heat insulation between the rectifier and the frame, concurrently with the electrical connection therebetween.

DETAILED DESCRIPTION OF THE PREFERRED EMBODIMENTS

With reference to the accompanying drawings, hereinafter will be described in detail an embodiment of a vehicle alternator to which a rotary electric machine for vehicles of the present invention is applied.

Figure 1:
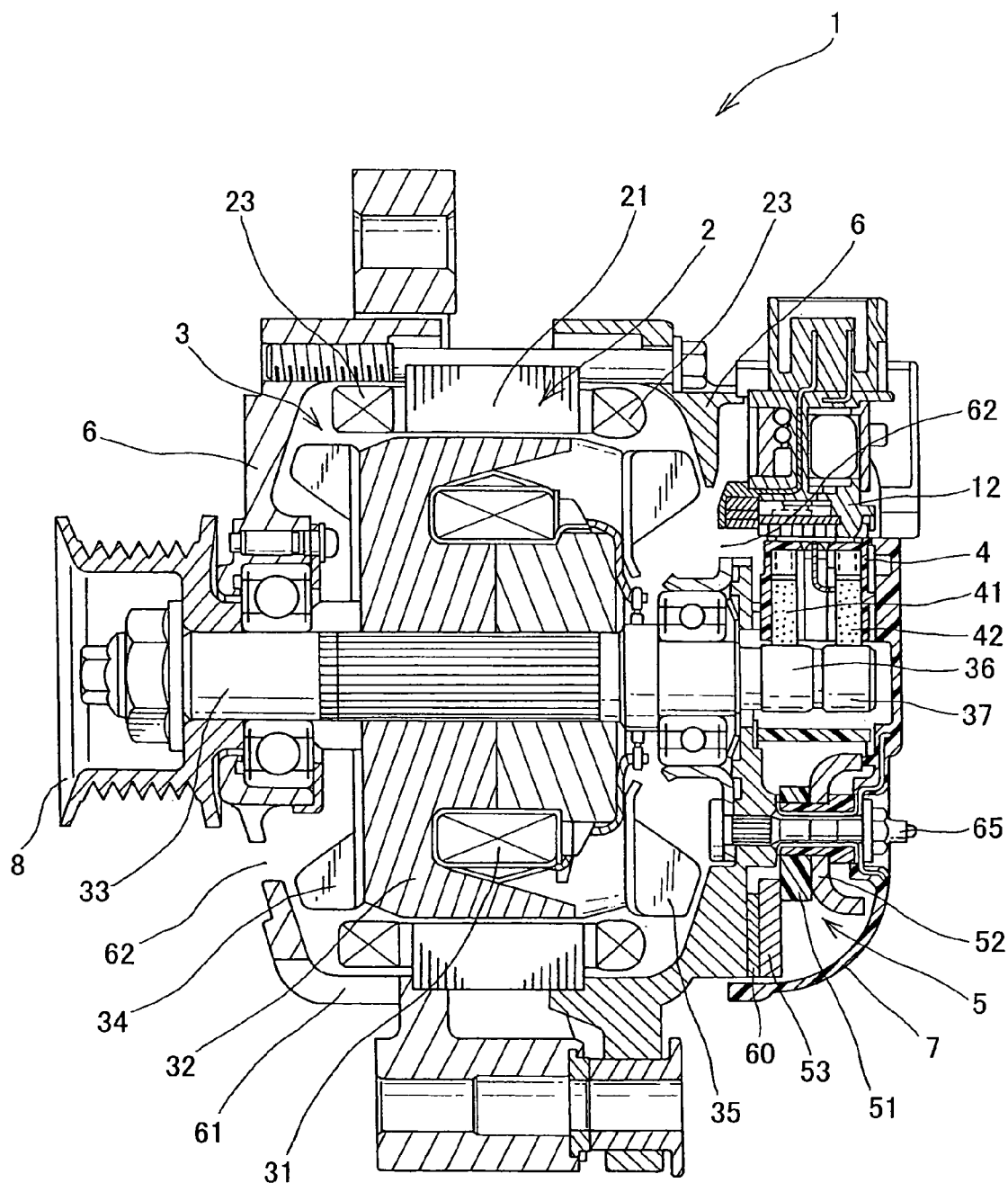
FIG. 1 is a cross-sectional view illustrating a general configuration of a vehicle alternator according to an embodiment of the present invention.

FIG. 1 is a cross-sectional view illustrating a general configuration of a vehicle alternator according to an embodiment of the present invention. A vehicle alternator 1 shown in FIG. 1 includes a stator 2, a rotor 3, a brush device 4, a rectifier 5, a frame 6, a rear cover 7 and a pulley 8.

The stator 2 includes a stator core 21, and a three-phase stator winding 23 which is wound about the stator core 21 at predetermined intervals, while being disposed in a plurality of slots formed in the stator core. The rotor 3 includes a field winding 31 made up of an insulated copper wire which is coaxially wound to have a cylindrical shape, and pole cores 32 each having a plurality of pole claws. The field winding 31 is laterally sandwiched between the pole cores 32 with a rotary shaft 33 passing through the pole cores. A cooling fan 34 is attached such as by welding to an end face of the front-side pole core 32. Similarly, a cooling fan 35 is attached such as by welding to the rear-side pole core 32.

The brush device 4 plays a role of passing excitation current from the rectifier 5 to the field winding 31 of the rotor 3, and includes brushes 41, 42 pressed against slip rings 36, 37, respectively, formed at the rotary shaft 33 of the rotor 3.

The rectifier 5, which is secured to an outer end face of the frame 6, plays a role of rectifying the three-phase AC voltage that is the output voltage from the three-phase stator winding 23 to obtain DC output power. The rectifier 5 is configured being provided with a terminal block 51 containing therein wiring electrodes, positive- and negative-side radiator plates 52, 53 which are disposed with a predetermined interval therebetween, and a plurality of rectifying elements serving as low-loss elements. The rectifying elements are press-fitted to press-fitting bores formed in each of the radiator plates.

The frame 6 accommodates the stator 2 and the rotor 3. The rotor 3 is supported by the frame 6 so as to be rotatable about the rotary shaft 33. Meanwhile, the stator 2 is secured to the frame 6 so as to be disposed on the outer peripheral side of the pole cores 32 of the rotor 3, being apart from the rotor 3 by a predetermined distance. The frame 6 includes outlet and inlet windows 61, 62 for cooling air. The outlet window 61 is provided at a portion facing the stator winding 23 which is projected from an axial end face of the stator core 21. The inlet window 62 is provided at each axial end face of the frame 6.

The rear cover 7 entirely covers, for protection, the brush device 4, the rectifier 5 and a controller 12, which are all mounted outside the frame 6 on the rear side. The rear cover 7 has an axial end face corresponding to an area facing the rectifier 5. In this area of the axial end face, a plurality of inlet windows (not shown) are formed to introduce cooling air into the rear cover 7 with the rotation of the rear-side cooling fan 35.

In the vehicle alternator 1 having the structure as explained above, the rotor 3 is designed to rotate in a predetermined direction, when torque is given to the pulley 8 by an engine (not shown) via a belt or the like. When excitation voltage is applied from outside, in this state, to the field winding 31 of the rotor 3, the claws of each of the pole cores 32 are excited to generate three-phase AC voltage across the stator winding 23. Resultantly, DC output power can be derived from an output terminal of the rectifier 5.

Figure 2:
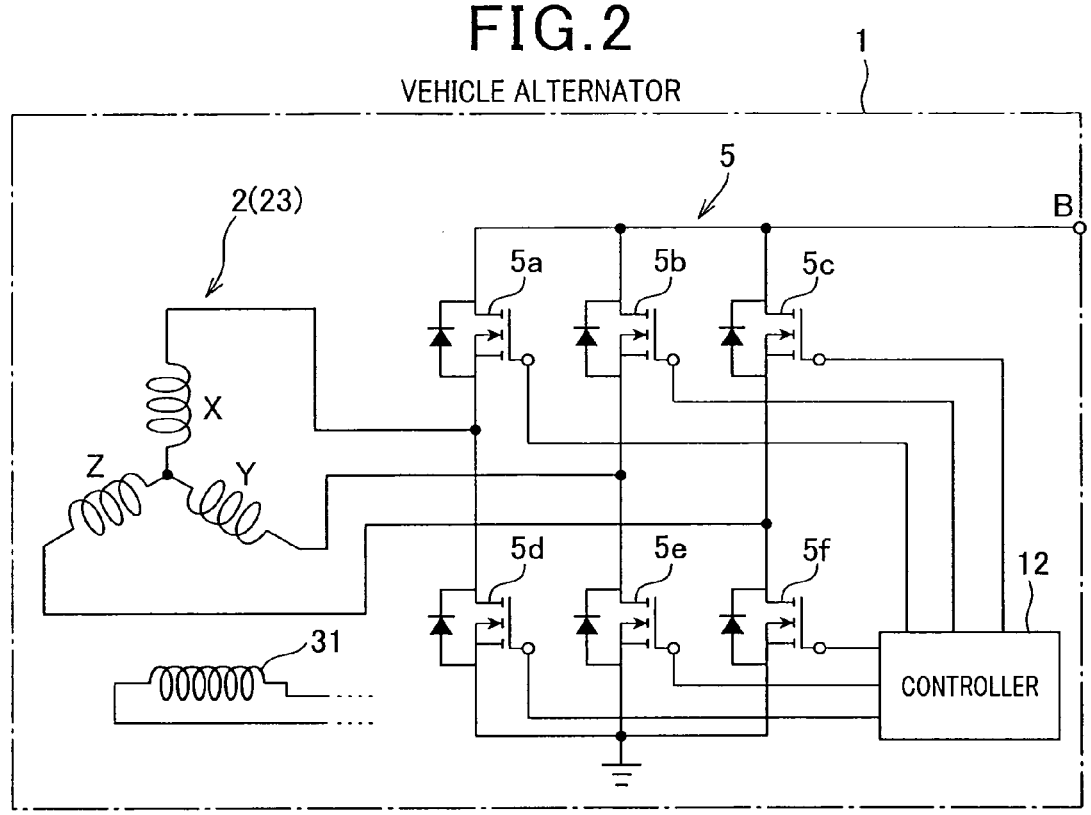
FIG. 2 is a connection wiring diagram illustrating the vehicle alternator.

FIG. 2 is a connection wiring diagram illustrating the vehicle alternator 1. The rectifying elements used in the rectifier of the present embodiment are MOS transistors 5a-5f having less loss than generally used silicon diodes during power on. The controller 12 performs on/off control of the excitation current to be passed to the field winding 31. At the same time, the controller 12 controls the timing for supplying current to the six MOS transistors 5a-5f provided at the rectifier 5. Of the six MOS transistors 5a-5f, three MOS transistors 5a-5c are joined to the positive-side radiator plate 52 and the remaining three MOS transistors 5d-5f are joined to the negative-side radiator plate 53.

The MOS transistors 5a-5f having less loss than generally used silicon diodes during power on as mentioned above, can suppress the amount of heat generated by the rectifier 5. Therefore, the temperature of the negative-side radiator plate 53 of the rectifier 5, which is located on the side of the frame 6, can be made lower than the temperature of the frame 6. In the present embodiment, a heat insulator 60 is disposed between the frame 6 and the rectifier 5 to prevent heat transfer from the frame 6 having higher temperature to the rectifier 5 even in such a case. The heat insulator 60 is disposed being clamped between the frame 6 and the negative-side radiator plate 53 of the rectifier 5.

Specifically, the heat insulator 60 may be formed using such a material as stainless steel, ceramic, resin or glass, or a material obtained by combining these materials. The heat insulator 60 may be formed easily by using each of these materials. Further, interposition of the heat insulator 60 may easily shield the negative-side radiator plate 53 from heat radiated from the frame 6, compared with the case where the radiator plate 53 is directly brought into contact with the frame 6. In addition, concurrently with the heat insulation, use of stainless steel, an electrically conductive material, as the heat insulator 60, can establish electrical connection for grounding between the negative-side radiator plate 53 and the frame 6.

Alternatively, a simple gap may be provided between the frame 6 and the negative-side radiator plate 53 to serve as the heat insulator 60, instead of using a member made of the materials, such as stainless steel, mentioned above. Formation of such a gap can decrease the number of parts and the cost, and may increase the amount of cooling air when the heat insulator 60 (the gap) is used as a passage of cooling air.

The present embodiment uses the heat insulator 60 in order to reduce heat transfer between the rectifier 5 and the frame 6.

Therefore, this may require a scheme for also reducing heat transfer in securing the rectifier 5 to the frame 6. In particular, the need that the negative-side radiator plate 53 has to be electrically and directly connected to the frame 6, necessitates the cutoff of the heat therebetween.

Figure 3A:
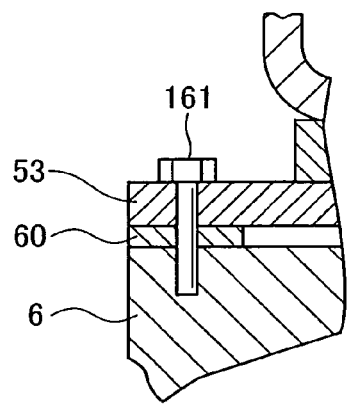
FIG. 3A is a schematic partial cross-sectional view illustrating a partial structure in which a negative-side radiator of a rectifier is secured to a frame by means of a screw.
Figure 3B:
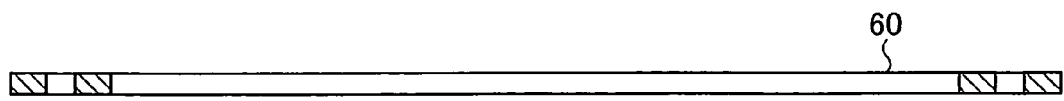
FIG. 3B is a cross-sectional view illustrating a whole image of the negative-side radiator of a rectifier.

FIG. 3A is a schematic partial cross-sectional view illustrating a partial structure in which the negative-side radiator 53 of the rectifier 5 is secured to the frame 6 by means of a screw, and FIG. 3B is a cross-sectional view illustrating a whole image of the negative-side radiator of a rectifier;

In the structure shown in FIG. 3A, the heat insulator 60 is interposed between the negative-side radiator plate 53 and the frame 6, and in this state, the radiator plate 53 is fixed to the frame 6 by means of a screw 161 made of stainless steel. Use of the stainless steel screw 161 can suppress the heat transfer from the frame 6 to the radiator plate 53 via the screw 161. In this case, an electrical connection can be established between the negative-side radiator plate 53 and the frame 6 via the screw 161. If an electrically conductive material of stainless steel is used for the heat insulator 60, the electrical resistance between the negative-side radiator plate 53 and the frame 6 can be further reduced.

Figure 4A:
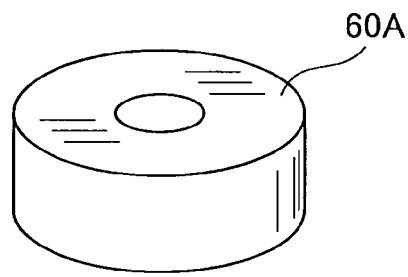
FIG. 4A is a perspective view illustrating a columnar heat insulator having a through bore at the center thereof.
Figure 4B:
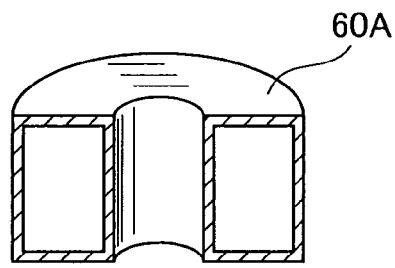
FIG. 4B is a perspective view including a vertical cross section of the heat insulator illustrated in FIG. 4A.

FIGS. 4A and 4B show another example of the heat insulator 60 that is an electrically conductive body. FIG. 4A is a perspective view illustrating the heat insulator 60A made of a metallic material and having a columnar shape with a through bore being formed at the center thereof. FIG. 4B is a perspective view including a vertical cross section of the heat insulator 60A shown in FIG. 4A. A hollow structure as shown in FIG. 4B can exert a heat insulating effect. Use of a metallic material, such as stainless steel, that can suppress heat transfer may enhance the heat insulating effect exerted by the hollow structure. The through bore at the center is used for passing the screw 161 shown in FIG. 3A therethrough. Depending on the positions where the radiator plate 60 is used, use of the screw 161 can be omitted. Accordingly, depending on the positions, formation of the through bore may be omitted, or the columnar shape may be changed to a different shape.

Figure 5:
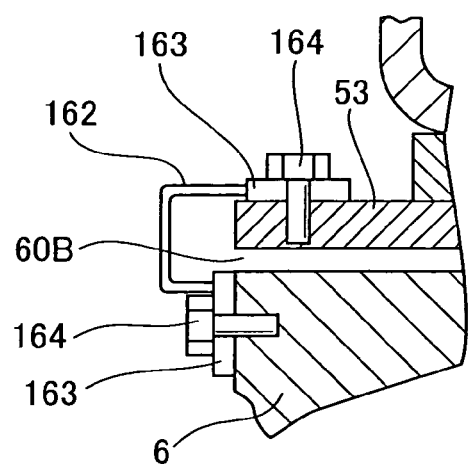
FIG. 5 is a partial cross-sectional view illustrating an example of electrical connection between a negative-side radiator plate and a frame in the case where the heat insulator is provided in the form of a gap.

FIG. 5 is a partial cross-sectional view illustrating an example of electrical connection for grounding between the negative-side radiator plate 53 and the frame 6 in the case where the heat insulator 60B is provided in the form of a gap. In the structure shown in FIG. 5, while the heat insulator 60B is a gap, the electrical connection for grounding between the negative-side radiator plate 53 and the frame 6 is established using a conductor wire 162. As shown, washers 163 are provided at both ends of the conductor wire 162 and secured to the radiator plate 53 and the frame 6 by tightening respective screws 164. The conductor wire 162 may be fixed by welding or soldering.

As described above, in the vehicle alternator 1 according to the present embodiment, use of the MOS transistors as the low-loss elements can reduce the amount of heat generated by the rectifier 5 per se. In addition, arrangement of the heat insulator 60 between the rectifier 5 and the frame 6 can cut off the heat emitted from the frame 6. As a result, the cooling properties of the rectifier 5 can be enhanced. Also, since the heat produced by the stator 2 of the alternator 1 can be transferred to the frame 6, deterioration can be prevented in the cooling properties of the alternator 1 as a whole.

The present invention is not intended to be limited to the above embodiment, but may be modified in various manners without departing from the spirit of the present invention.

The above embodiment has exemplified the rectifier 5 in which the negative-side radiator plate 53 is disposed on the side of the frame 6. However, the present invention may be applied to a rectifier in which the positive-side radiator plate 52 is disposed on the side of the frame 6. In this case, an insulating material of ceramic, resin or glass may be used for the heat insulator 60 to ensure electrical insulation between the positive-side radiator 52 of the rectifier and the frame 6, concurrently with the heat insulation. Also, in this case, the electrical connection for grounding between the negative-side radiator plate 53 and the frame 6 may be established via a stud bolt 65 (see FIG. 1) extending from the frame 6. It is desirable that the stud bolt 65 is made of a material, such as stainless steel, that suppresses heat transfer.

As a matter of course, the present invention may be applied to a rectifier in which the MOS transistors are mounted on a single power board.

In the above embodiment, the rectifier 5 has been configured using the MOS transistors 5a-5f as the low-loss elements. Alternatively, other low-loss elements, such as low-loss diodes, may be used to configure a rectifier.

In the above embodiment, the description has been given on the vehicle alternator 1 having a function of electric generation. However, the present invention may be applied to a rotary electric machine for vehicles having functions of a generator and a motor. In this case, the controller 12 may effect control in such a way that the rectifier 5 can operate as an inverter to apply three-phase AC voltage to the stator winding 23, for rotation of the rotor 3.

In the above embodiment, stainless steel has been used as an example of a material having heat conductivity smaller than that of aluminum. However, other materials may be used.

What is claimed is:

1. A rotary electric machine for vehicles, comprising:
   a rotor;
   a stator disposed opposed to the rotor;
   a frame made of aluminum and supporting the rotor and the stator;
   a rectifier secured to an outer end face of the frame and having low-loss elements used as rectifying elements; and
   a heat insulator disposed between the rectifier and the frame,
   wherein the rectifier comprises a positive-side radiator plate joined with positive-side rectifying elements and a negative-side radiator plate joined with negative-side rectifying elements;
   the negative-side radiator plate is disposed opposed to the frame with the heat insulator interposed between the negative-side radiator plate and the frame; and
   the heat insulator is formed of an electrically conductive material to establish electrical connection between the negative-side radiator plate and frame via the heat insulator.

2. The rotary electric machine for vehicles according to claim 1, wherein the low-loss elements are low-loss power diodes.

3. The rotary electric machine for vehicles according to claim 2, wherein the heat insulator is formed of a material having heat conductivity smaller than heat conductivity of aluminum.

4. The rotary electric machine for vehicles according to claim 2, wherein the heat insulator is formed of one selected from a group of materials consisting of stainless steel, ceramic, resin and glass.

5. The rotary electric machine for vehicles according to claim 2, wherein the heat insulator is provided as a gap which is formed by locating both the rectifier and the frame to be spatially apart from each other by a distance corresponding to the gap.

6. The rotary electric machine for vehicles according to claim 2, wherein the rectifier is secured to the frame by means of a screw which is formed of a material having heat conductivity smaller than heat conductivity of aluminum.

7. The rotary electric machine for vehicles according to claim 1, wherein the low-loss elements are MOS transistors.

8. The rotary electric machine for vehicles according to claim 7, wherein the heat insulator is formed of a material having heat conductivity smaller than heat conductivity of aluminum.

9. The rotary electric machine for vehicles according to claim 7, wherein the heat insulator is formed of one selected from a group of materials consisting of stainless steel, ceramic, resin and glass.

10. The rotary electric machine for vehicles according to claim 7, wherein the heat insulator is provided as a gap which is formed by locating both the rectifier and the frame to be spatially apart from each other by a distance corresponding to the gap.

11. The rotary electric machine for vehicles according to claim 1, wherein the heat insulator is formed of a material having heat conductivity smaller than heat conductivity of aluminum.

12. The rotary electric machine for vehicles according to claim 1, wherein the heat insulator is formed of stainless steel.

13. The rotary electric machine for vehicles according to claim 1, wherein the heat insulator is formed of ceramic.

14. The rotary electric machine for vehicles according to claim 1, wherein the heat insulator is formed of a resin.

15. The rotary electric machine for vehicles according to claim 1, wherein the heat insulator is formed of glass.

16. The rotary electric machine for vehicles according to claim 1, wherein the heat insulator is provided as a gap which is formed by locating both the rectifier and the frame to be spatially apart from each other by a distance corresponding to the gap.

17. The rotary electric machine for vehicles according to claim 1, wherein the rectifier is secured to the frame by means of a screw which is formed of a material having heat conductivity smaller than heat conductivity of aluminum.

18. The rotary electric machine for vehicles according to claim 1, wherein the heat insulator is formed of a material having heat conductivity smaller than heat conductivity of aluminum.

19. The rotary electric machine for vehicles according to claim 1, wherein the heat insulator is an electrically conductive body having a hollow structure.

\* \* \* \* \*